(12) United States Patent
Ullmann et al.

(10) Patent No.: US 7,873,954 B2
(45) Date of Patent: *Jan. 18, 2011

(54) STACK UNIQUE SIGNATURES FOR PROGRAM PROCEDURES AND METHODS

(75) Inventors: Lorin Ullmann, Austin, TX (US); Allen Chester Wynn, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/433,681

(22) Filed: May 12, 2006

(65) Prior Publication Data

US 2006/0206875 A1  Sep. 14, 2006

Related U.S. Application Data

(63) Continuation of application No. 10/047,011, filed on Jan. 16, 2002, now Pat. No. 7,080,359, which is a continuation-in-part of application No. 09/497,606, filed on Feb. 3, 2000, now Pat. No. 6,550,058.

(51) Int. Cl.
*G06F 9/45* (2006.01)
(52) U.S. Cl. ..................................................... 717/160
(58) Field of Classification Search ......... 717/128–130, 717/136, 159–160; 370/389, 396, 401, 392; 711/1, 220, 170; 712/233, 225, 202, 244; 271/178, 3.12
See application file for complete search history.

(56) References Cited

U.S. PATENT DOCUMENTS

| 5,191,534 A | 3/1993 | Orr et al. |
| 5,450,586 A * | 9/1995 | Kuzara et al. ............... 717/124 |
| 5,579,520 A | 11/1996 | Bennett |
| 5,606,661 A | 2/1997 | Wear et al. |

(Continued)

FOREIGN PATENT DOCUMENTS

CA       2241865       12/1999

(Continued)

OTHER PUBLICATIONS

USPTO; examination correspondence in related U.S. Appl. No. 10/047,011, filed Jan. 16, 2002 by Lorin Ullmann, now U.S. patent 7,080,359.

(Continued)

*Primary Examiner*—Tuan Anh Vu
(74) *Attorney, Agent, or Firm*—Robert H. Frantz; Murk Walker; Libby Z. Toub (57) ABSTRACT

Stack signature marking segments are inserted into re-entrant programming source code modules prior to compilation of the modules at each code module entry point and at each code module exit point, followed by producing one or more executable programs from the programming source code modules. Upon execution of instances of the executable programs, the inserted segments assign unique, non-duplicated module identifier values to the instances of the code modules, generate an instance count for each instantiation of executable code module in the stack signature for each object instance dynamically created during runtime of a re-entrant executable code module, and push onto a processing stack the module identifier values and the instance counts within stack frames allocated to each of the executable program instances.

14 Claims, 6 Drawing Sheets

U.S. PATENT DOCUMENTS

| | | | |
|---|---|---|---|
| 5,628,016 A | 5/1997 | Kukol | |
| 5,774,729 A | 6/1998 | Carney et al. | |
| 5,926,631 A | 7/1999 | McGarvey | |
| 5,950,003 A | 9/1999 | Kaneshiro et al. | |
| 6,002,872 A | 12/1999 | Alexander et al. | |
| 6,014,515 A | 1/2000 | Burch | |
| 6,110,226 A | 8/2000 | Bothner | |
| 6,119,206 A | 9/2000 | Tatkar et al. | |
| 6,131,187 A | 10/2000 | Chow et al. | |
| 6,161,219 A | 12/2000 | Ramkumar et al. | |
| 6,289,446 B1 | 9/2001 | Nilsson | |
| 6,293,712 B1 | 9/2001 | Coutant | |
| 6,314,558 B1 * | 11/2001 | Angel et al. | 717/118 |
| 6,519,767 B1 | 2/2003 | Carter et al. | |
| 6,662,358 B1 | 12/2003 | Berry et al. | |
| 6,807,583 B2 | 10/2004 | Hrischuk et al. | |
| 6,862,696 B1 | 3/2005 | Voas | |
| 6,968,540 B2 * | 11/2005 | Beck et al. | 717/130 |
| 7,039,738 B2 * | 5/2006 | Plummer et al. | 710/260 |
| 7,251,810 B1 * | 7/2007 | Nolte | 717/130 |

FOREIGN PATENT DOCUMENTS

| | | |
|---|---|---|
| WO | 9949392 | 9/1999 |

OTHER PUBLICATIONS

Diaz, et al.; "Milenio: a secure Java2-based mobile agent system with a comprehensive security", INSPEC ABN C2001-03-61308-072, Solvene Soc. Informatika (Slovenia), vol.24, No. 4, pp. 475-485, Dec. 2000, Abstract.

Diaz, et al.; "An implementation of a secure Java2-based mobile agent system"; INSPEC ABN C2000-12-6150N-083, ISBN 1902426096, Proceedings of the Second International Conference on the Practical Application of Java, pp. 125-142, Published by Blackpool, UK, 2000, Abstract.

Diaz, Perez, et al.; "An implementation of a secure Java2-based mobile agent system", INSPEC ABN C2000-12-6150-066, Proceedings of the Fifth International Conference on the Practical Application of Intelligent Agent and Multi Agent Technology, pp. 133-150, Published: Blackpool, UK, 2000, Abstract.

* cited by examiner

Figure 1

*Prior Art*

Figure 2

*Prior Art*

STACK UNIQUE SIGNATURES FOR PROGRAM PROCEDURES AND METHODS

CROSS-REFERENCE TO RELATED APPLICATIONS (CLAIMING BENEFIT UNDER 35 U.S.C. 120)

This patent application is a continuation of U.S. patent application Ser. No. 10/047,011, filed on Jan. 16, 2002, now U.S. Pat. No. 7,080,359, which was a continuation-in-part of U.S. application Ser. No. 09/497,606, filed on Feb. 3, 2000, now issued as U.S. Pat. No. 6,550,058. Both related applications include Allen C. Wynn as a co-inventor, and all three applications are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. Pat. Nos. 7,080,359, and 6,550,058 are hereby incorporated by reference in their entireties, including figures.

BACKGROUND OF THE INVENTION

1. Field of the Invention

This patent application is a continuation of U.S. patent application Ser. No. 10/047,011, filed on Jan. 16, 2002, which was a continuation-in-part of U.S. application Ser. No. 09/497,606, filed on Feb. 3, 2000, now issued as U.S. Pat. No. 6,550,058. This invention relates to technologies and methods for debugging runtime exceptions when developing or testing software, and especially to debugging and diagnosing failures related to Java and embedded Java Virtual Machines.

2. Description of the Related Art

The Java programming language and Java Virtual Machine (JVM) execution environment are well known in the art. Many programmers and designers are skilled at developing application programs in Java to be run under a JVM.

An "exception", according to the Java Virtual Machine Specification, is defined as an event which occurs when a Java program violates the semantic constraints of the Java language. For example, a program may attempt to index outside the bounds of a data array. In general, an exception may be "thrown" for one of three reasons:

(1) an abnormal execution condition is synchronously detected by a Java Virtual Machine;
(2) an operation is performed that violates the normal semantics of the Java language, such as indexing outside the bounds of an array; or
(3) an error occurs when loading or linking part of a Java program.

When an exception is thrown, the JVM performs a non-local transfer of control from the point where the exception occurred to an exception handling point, which is specified by the designer of the violating program. Therefore, in Java parlance, the exception is "thrown" from the point were the error occurs, and "caught" at the point to which control is transferred. If the exception is caught at a point outside the violating method, it is referred to as having completed abruptly.

Using "throw statements", Java programs may also throw exceptions explicitly, which provides an alternative to the traditional method of returning error values, such as the integer value "−1".

In order to throw an exception, a JVM abruptly completes, one-by-one, all expressions, statements, method and constructor invocations, static initializers, and field initialization expressions that are running in the current thread until a handler is found that indicates that it handles the thrown exception (e.g. by naming the class of the exception or a superclass of the class of the exception). If no exception handler is found, a default method, "uncaught-Exception", is invoked for the thread group that is the parent of the current thread.

The Java class "RuntimeException" is a subclass of class "Exception", subclasses of which are unchecked exception classes. The unchecked runtime exceptions defined by package "java.lang" are given in Table 1.

TABLE 1

| Java Runtime Exceptions | |
| --- | --- |
| Exception Name | Example or Description |
| Arithmetic Exception | an integer division or remainder operation with a zero divisor |
| Array Store Exception | storing a value whose class is not assignment compatible with the component type of the array |
| Class Cast Exception | casting a reference to an object to an inappropriate type |
| Illegal Monitor State Exception | waiting on an object that it has not been locked |
| Index Out Of Bounds Exception | an index or a subrange specified out of range |
| Negative Array Size Exception | creating an array with a negative length |
| Null Pointer Exception | using a null reference in a case where an object reference is required |
| Security Exception | security violation |

While debugging Java runtime exceptions (e.g. NULL pointer), it is difficult to locate the origin of the exceptions because the call chain is generated from the nearest method which catches the exception. Many of the methods which were executed in between are skipped by the dump stack methods, which obfuscates the call-path and the method which caused the exception.

When using embedded Java Virtual Machines (JVM), the ability of an engineer or software tester to be able to find the originator of an uncaught exception is especially important as the exception can possibly bring the entire JVM down.

Therefore there is a need in the art for a system and method which aids a software designer in determining the originator of an uncaught exception so that the program error may be diagnosed and corrected. Further, there is a need in the art for this new system and method to be readily useful for popular programming languages and environments such as Java and JVM's.

BRIEF DESCRIPTION OF THE DRAWINGS

The following detailed description when taken in conjunction with the figures presented herein provide a complete disclosure of the invention.

SUMMARY OF THE INVENTION

The present invention provides a system and method for inserting stack signature marking segments into application program modules at the entry and exit points of the application program segments prior to compilations. Unique module identifier values are assigned to each application program module. During execution of the modified application software modules, upon entry into a new module or instance of a module, the unique module identifier is pushed onto the stack along with an instance number and an entry indicator. Upon termination of the module or instance of a module, the unique module identifier is pushed onto the stack with the instance number and an exit indicator, thereby placing an entry signature and an exit signature onto the stack bracketing the stack frame assigned to that module or module instance. During debug of exceptions, these signatures may be used to locate and identify stack frames and their associated software modules.

DETAILED DESCRIPTION OF THE INVENTION

The preferred embodiment of the present invention is to realize a stack signature generation method as a switch to a software compiler, and related software to automatically insert stack signature marking software into application programs at the time the application programs are being compiled.

Compilers often have many switches available to the user for various code execution, memory usage and compactness options, and security and privilege options. In an alternate embodiment of the present invention, the compile option may be implemented as a "#pragma" compiler directive, which allows the software designer to designate specific procedures, modules, or areas of code for which he wishes the stack signature marking code to be injected.

For better understanding of the present invention, we first review the general operation of computer stacks and the calling and returning processes. A computer program process may "call" another process or subroutine to be executed on the same or by the same processor which is executing the "calling" process. When the "call" operation or instruction is executed, the execution of the "calling" process is halted at the point of the "call" instruction, and the "called" process or subroutine is initialized and executed.

In order to allow the "called" process or subroutine to fully utilize all or part of the processor's computing resources, including the processor's registers, and in order to preserve the context of the "calling" process, a program stack is used. A stack in a computer system is a data structure disposed in a computer-readable memory which dynamically stores variable and processor state information between process calls and returns.

Figure 1:
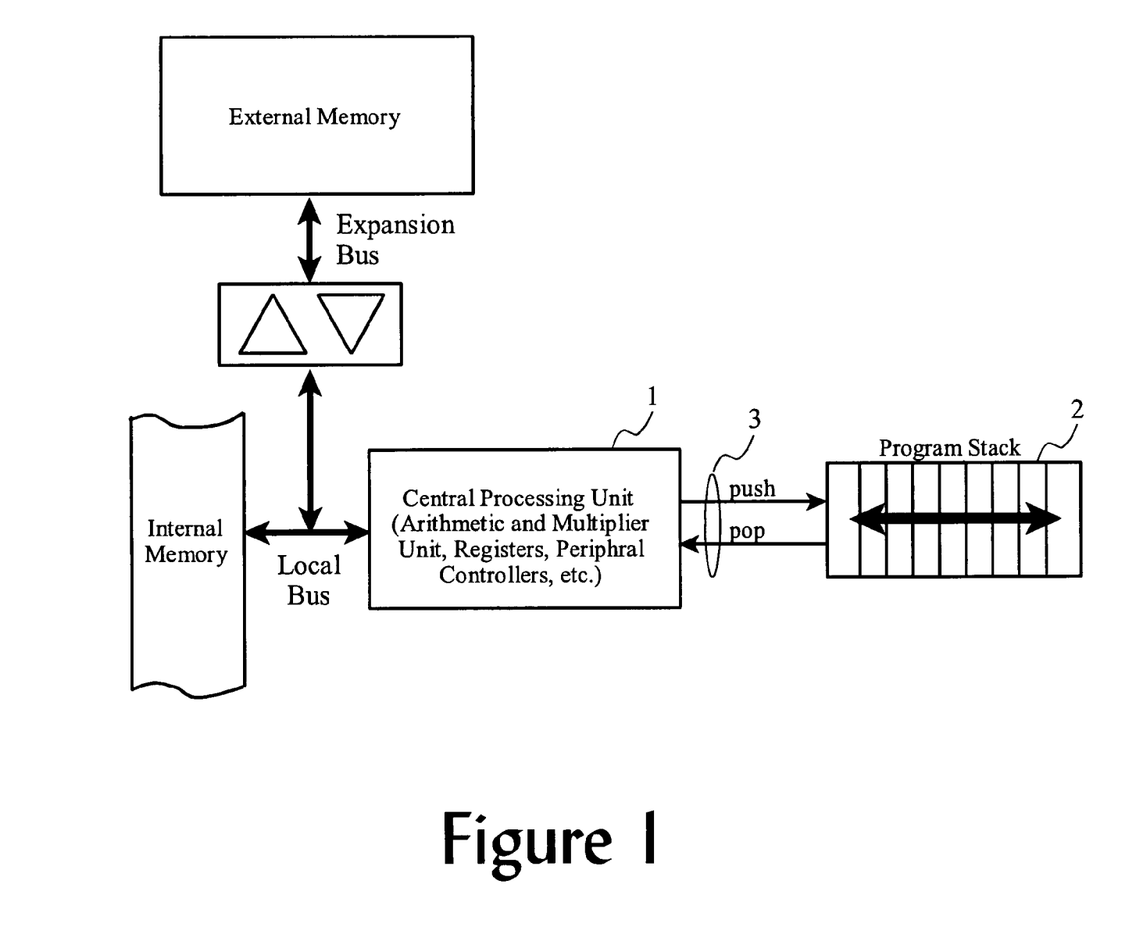
FIG. 1 shows the prior art relationship of central processing units and stack memory.

The stack has a "first-in-last-out" ("FILO") structure. As data is placed into it, or "pushed onto the stack", older data is pushed further into the structure. As shown in FIG. 1, a processor (1) has a bi-directional data bus (3) to the stack memory (2). Often, the stack memory and bi-directional data bus is integrated into the processor microchip itself.

At the assembly language level, most processors have a "push" operation which will copy data from a processor register or memory location to the top of the stack, and will adjust the top-of-stack pointer appropriately. Conversely, a "pop" operation will copy data from the top of the stack into a processor register or memory location, and will adjust the top-of-stack pointer. Some processors implement the stack in an incrementing address fashion, such that "pushes" result in increases in the stack pointer value, and "pops" result in decreases in the stack pointer value. Other processors may take the opposite approach, but achieve identical functionality, including adding data to the bottom of the stack rather than the top of stack. These variations of conventions for stack handling and construction are well understood in the art.

When the processor executes a "call" operation, an automatic "push" of the contents of the program counter register is made, thereby storing the return address of the calling process on the stack. When the called operation or subroutine executes a "return" operation, an automatic "pop" of the top of the stack contents is made to the program counter, which restores the program counter to the return address of the calling process or routine.

When a function call is made from a high-level language ("HLL"), such as "C" or Java, the compiler generates assembly language representing the higher-level statements in the HLL to implement the source code into assembly code. When a function or routine call includes arguments to be passed to and returned from the function or routine, the compiler injects not only the assembly "call" opcode into the assembly language, but also a block of code to store the argument values on the stack, as well. This block or sequence of assembly language instructions may include several "pushes", or special write or store operations, to the stack. Also, in typical HLL compilers, the processor context may be stored on the stack as part of the function or subroutine call operation. The context of the processor typically includes volatile processor register values, such as interrupt control registers, indirect addressing registers and other control registers. A processor-specific example of a volatile register which is stored as part of the context save is the ECX register of an Intel x86 processor.

When a subroutine is initialized as the result of a "call" operation, it typically sets up a local stack frame for data variables which are local to the subroutine. These local variables are usually addressed by an offset from the beginning of the local stack frame, commonly stored in a "base" register, such as BP or EBP on an Intel x86 processor. In addition, sometimes temporary or transient values are stored on the stack dynamically within the subroutine, rather than including them as part of the local stack frame.

Figure 2:
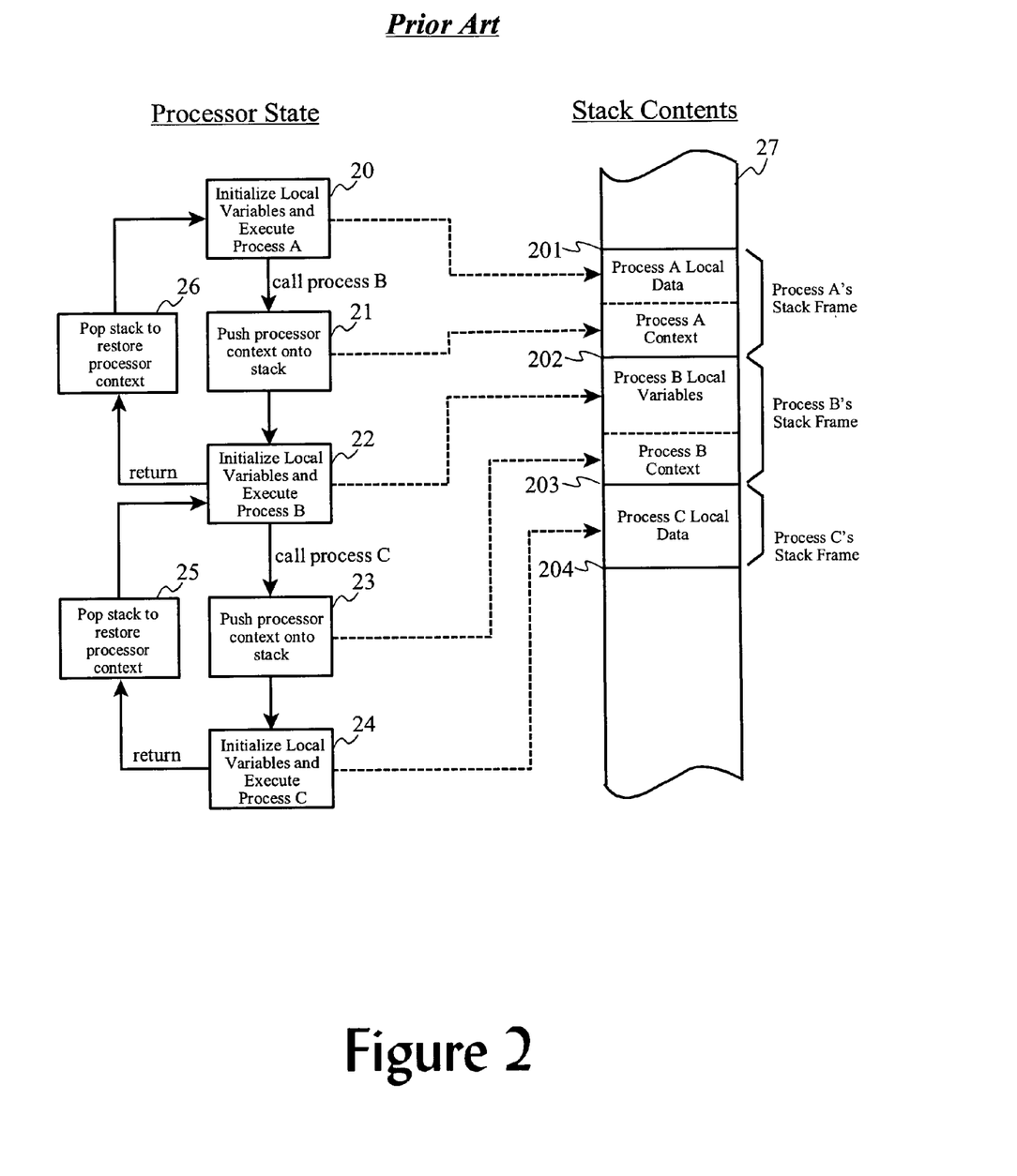
FIG. 2 illustrates the typical process of stack management related to program "call" and "return" operations.

As shown in FIG. 2, if executing Process A (20) calls Process B, the return address and context of the processor for Process A is pushed (21) onto the stack, and the pointer for the top of the stack is moved to the "top" of the memory containing the Process A context data (202). Further, space is created on the "top" of the stack for Process B's local variables. Execution of Process B then takes place (22), until Process B calls Process C. At this time, the processor pushes the processor context onto the stack for Process B's current state (23), and moves the top of stack pointer appropriately (203) to make room for Process C's local variables.

When Process C completes its execution, it will typically execute a "return" operation, which causes the processor to move the top of stack pointer down to Process B's area (202), and to "pop" or read the processor register values from the stack area for Process B (25). The register values are restored to B's state, and the software for Process B is resumed execution (22) from the point of the "call" operation in Process B's instruction code. When Process B completes its execution, a similar "return" operation is made, the top of stack pointer is moved downward (202), and the context for Process A is restored so that Process A's execution (20) can resume and the point of the "call" instruction in Process A's code. This type of general stack operation is well known within the art.

It well known within the art that the stack can be implemented in computer memory in linear, contiguous memory space, or it may be implemented as a distributed linked list of sections of memory space, while still providing the same functionality as described supra. Additionally, some computer systems "push" data onto the stack in incrementing address values (which results in "pops" decreasing the address values), while other systems "push" data onto the stack in decrementing address values (and "pops" increase the address value). Further, systems which run operating systems may contain the stack management functionality in operating system modules in order to free the application software from stack management, which in simpler systems, stack management may be handled directly by the application software modules. These variations of the pointer management do not affect the FILO operation of the stack, and are merely alternate implementations of the same structure.

Figure 3:
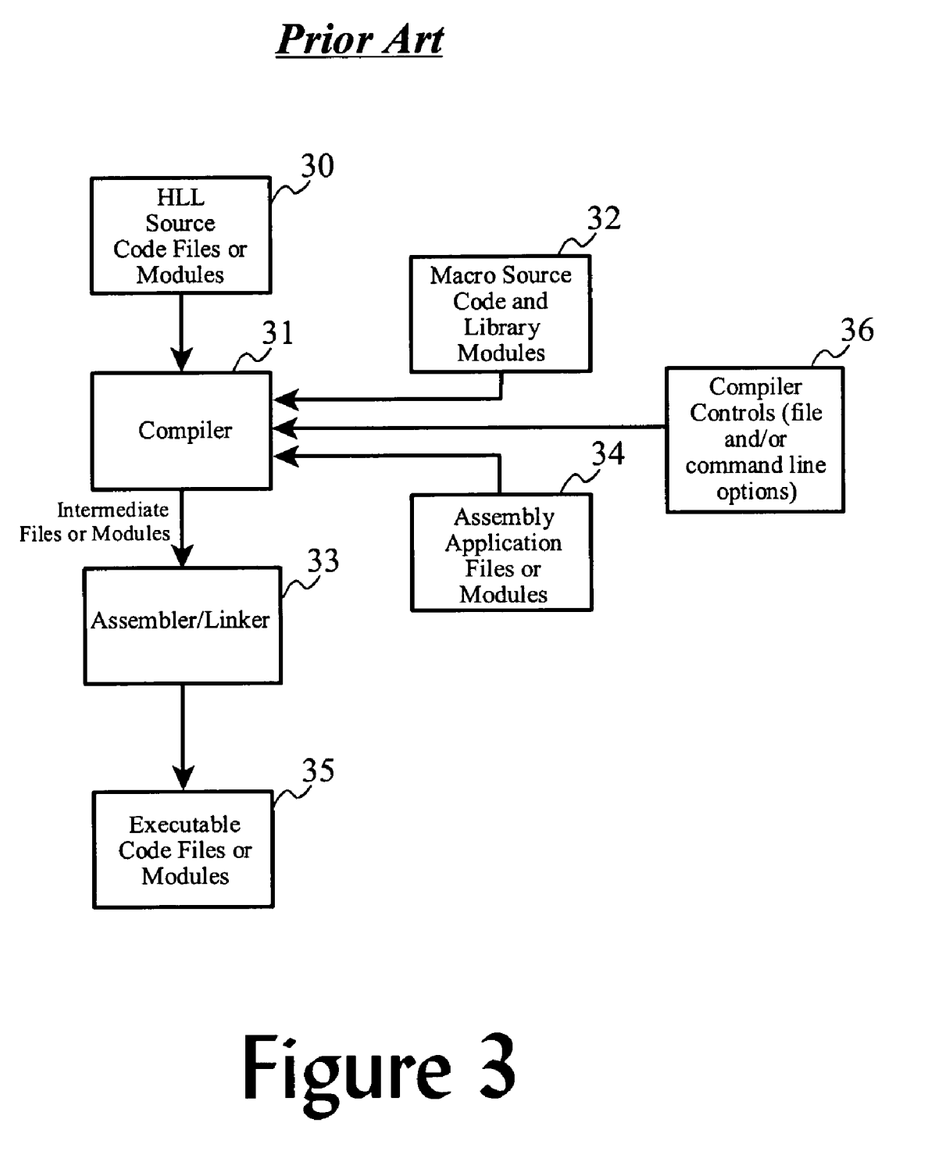
FIG. 3 shows the general process of compiling, assembling, linking and otherwise producing executable code from source code.

Turning to FIG. 3, the fundamental and well-known compiler and assembler process is shown. High-level source code (30), such as "C" or Java code, is compiled (31) by initially performing syntactical analysis, converting the source code to a standardized or tokenized format, processing any compiler directives, expanding any macros (32), including assembly and other library routines (34) as indicated by the code, and generating an intermediate representation of the code, such as an object file. The compiling process is controlled by various compiler controls (36), such as a "make file" for compiling "C" code and command-line options to the compiling invocation. In the final phase, the various modules of code which are in intermediate form are "assembled" and "linked" (33) to create a run-time image of executable binary code (35) for a specific processor. This general process is followed by most compilers for most languages, and is well understood in the art.

In the preferred embodiment, a standard compiler is modified to include the inventive method to insert the stack signature marking code during the early phases of processing the HLL source into intermediate or assembly language form. This approach has several advantages.

First, as all HLL is processed through this state, it allows the invention to be utilized on a wider array of source languages. Second, as assembly code is much more efficient than compiled HLL, the system performance impact of the code insertions is minimized by including the cleaning code as assembly code instead of HLL code or an HLL macro.

Figure 4:
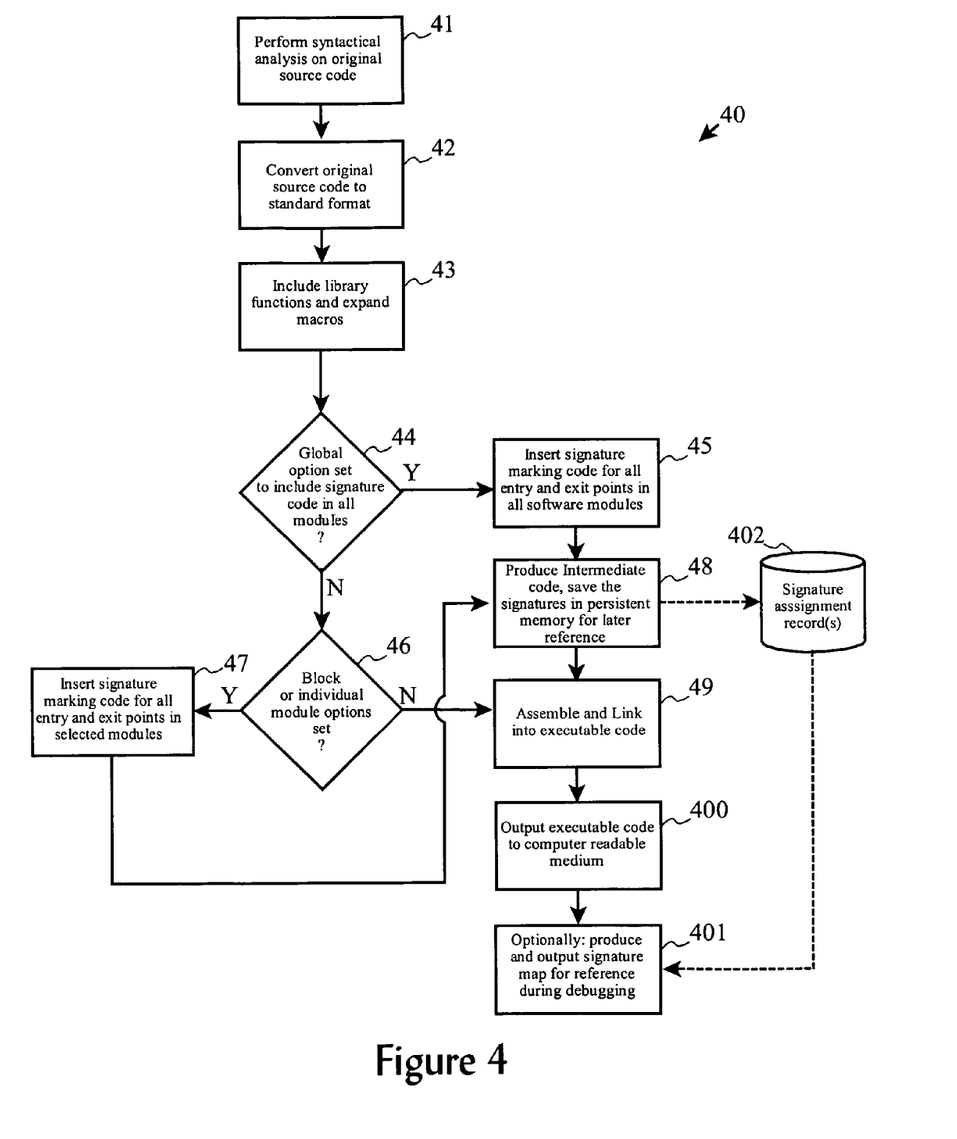
FIG. 4 discloses the logical process of the modified compilation process to include the insertion of the stack signature marking code in selected application programs during compilation.

However, in systems where runtime performance is not a primary concern, the stack signature marking code can be implemented as macro insertions in HLL. Therefore, the preferred embodiment process of compiling (40) has the following steps, and as shown in FIG. 4:

(a) perform (41) syntactical analysis on original source code;
(b) convert (42) the original source code to standard format;
(c) include library functions and expand macros as indicated by the source code (43);
(d) if global stack signature marking switch is selected (44), then perform the following steps for all code (45), otherwise (46), perform the following steps for code surrounded by a enable-disable pair of compiler directives (47):
  (1) scan code for entry points and "return" operations;
  (2) for each entry point and "return" operation, insert code for placing a signature value on the stack, using an entry indicator for the entry points and an exit indicator for the exit points;
(e) produce (48) intermediate code, including storing the assigned signature values to persistent memory (402) such as in a computer file;
(f) assemble and link (49) the intermediate code into executable code;
(g) output (400) the executable code to a computer-readable medium; and
(h) optionally, generate (401) a map or listing of signature values assigned to each entry and exit (return) point in the code for use by a software designer during debug.

For step (d), the preferred embodiment includes four types of compiler controls: a global control, a per-procedure control, an enable-disable pair, and a command line option. If a global control, such as:

pragma stack_signature_mark_all is included in the compiler control file, all software will be processed and modified to include the stack signature marking method where applicable.

If a per-procedure control, such as:

pragma stack_signture_mark_next_procedure is included in the compiler control file, only the code of the following procedure will be processed and modified to include the stack signature marking method where applicable.

If a compiler directive enable-disable control pair, such as:

pragma stack_signature_marking_on
...                          /* executable source code
pragma stack_signature_marking_off is included in the source code, then only code located between the control pair will be processed and modified to include the stack signature marking method where applicable.

Alternatively, the global control can be set to enable the insertion of the stack signature marking code by a command line parameter upon invocation of the compiler, such as:

make control_file_name-signature_mark_stack_all

Figure 5:
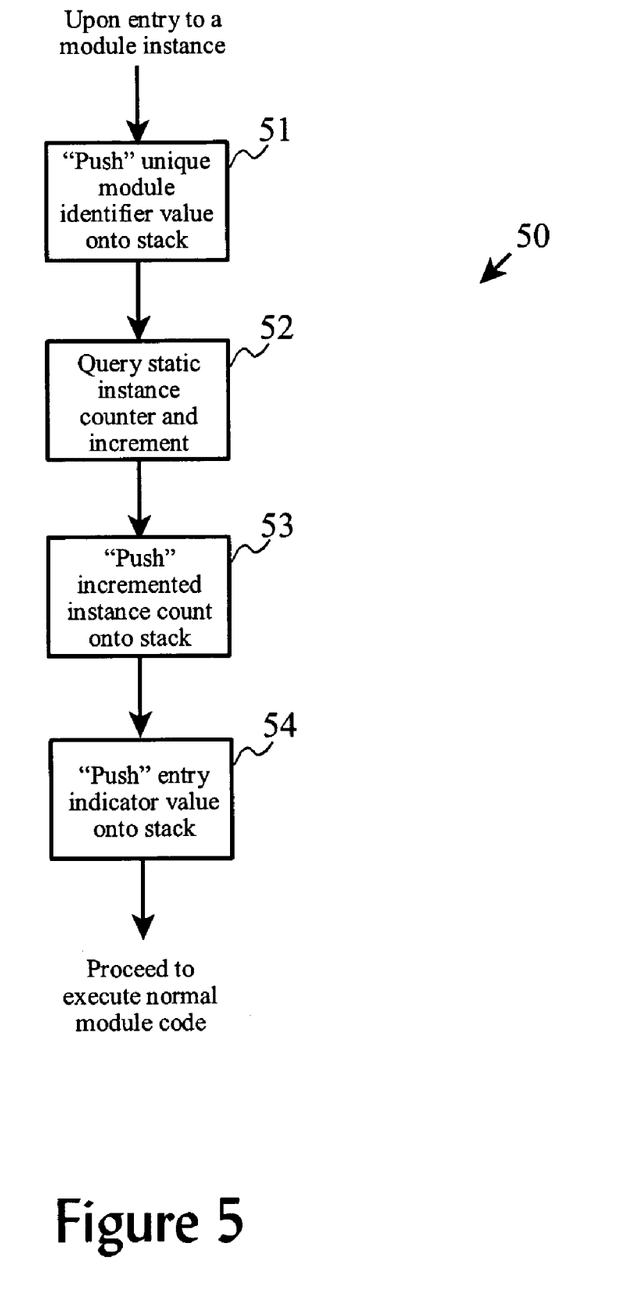
FIG. 5 sets forth the logical process of the signature marking code which is inserted into selected application programs near their entry points.
Figure 6:
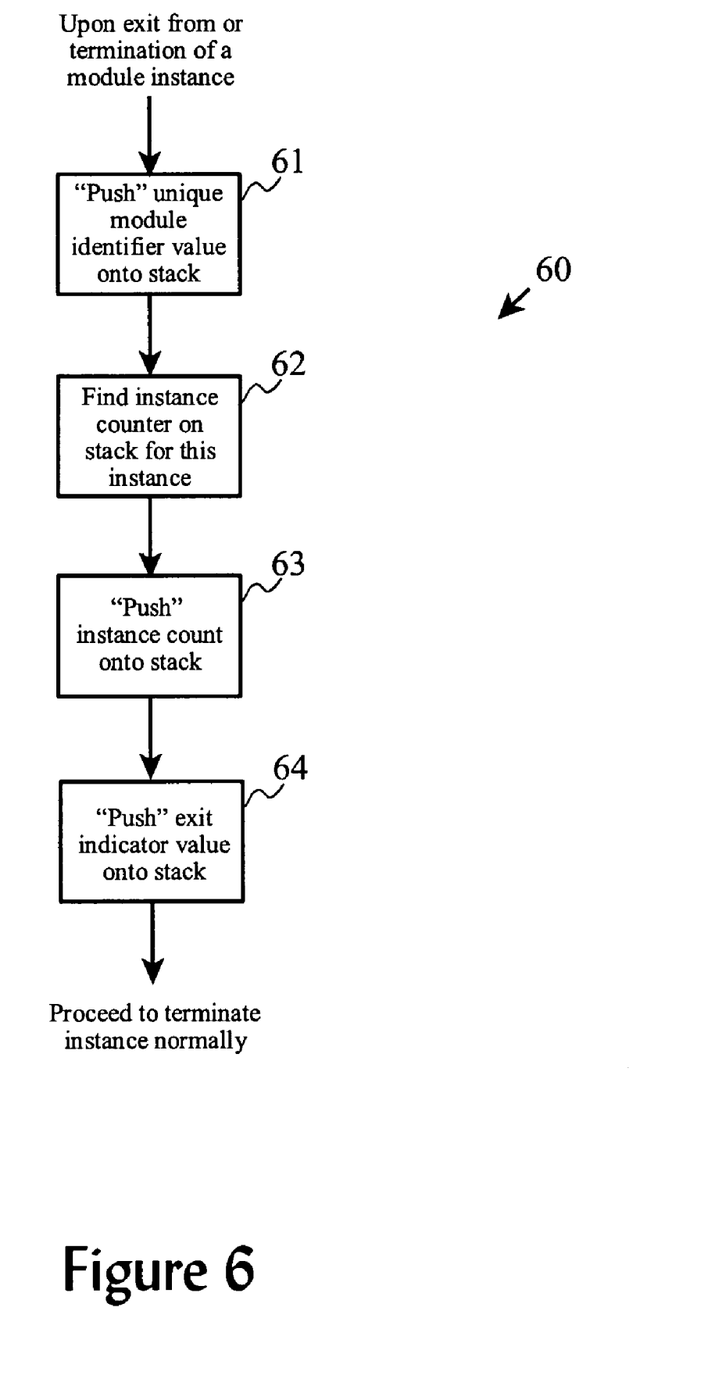
FIG. 6 sets forth the logical process of the signature marking code which is inserted into selected application programs near their exit points.

Turning to FIGS. 5 and 6, the methods of the signature marking code for entry and exit, respectively, which are inserted into application programs by the modified compiler are shown in preferred embodiments. The objective of the code to be inserted into each application program is to provide it with software which will place a "signature" or recognizable data pattern on the stack when it is run and when it terminates or "returns". Then, during debug, the stack can be examined for these signatures, and it can be determined which portions of the stack belonged to which processes.

Once this is known, debug of the actual problem can proceed normally by inspecting the stack contents, states of the processes at the time of the exception, etc.

In a basic embodiment, the stack signature marking code portions which are inserted are assigned predetermined signature values during compilation by the modified compiler. Although the same code segments may be inserted in each application program, they may each be given a unique definition statement for their signature value.

However, in object oriented programming environments and for re-entrant code designs, a particular application module may be called or executed more than once simultaneously. Therefore, in order to effectively debug which copy or instance of an application program caused an exception, there is preferably a mechanism which allows the stack signature to be unique for each instance of an application program or method.

To provide this feature according to the preferred embodiment, static variables which are not garbage collected upon process termination are used in the stack signature marking code segments to provide some persistency or record as to which modules have run, which instance of a module is being instantiated, etc. For example, if a print module has been instantiated once, it could write to a static variable the unique identifier assigned to the print module during compile time followed by a number "1" for the first instance of that module. When a second instance of the print module is instantiated, it would query the static variable for the present instance number, add one to it (now "2"), and write that to the static variable for future use by future instances of the module. This module identifier and instance number would then be used as the "signature" for each instance on the stack. Further, a indicator for "entry" or "exit" may be recorded with the signature to provide more information regarding the history of the execution of each instance of each module. As such, each signature placed on the stack actually comprises a triplet of data values:

(a) a unique module identifier;
(b) an instance number; and
(c) an entry/exit indicator.

In a more advanced realization of the invention, if the system has a real-time clock, a time stamp could also be provided with the signatures on the stack. Another variation of the realization of the invention could include the use of a randomly-generated number for the unique module identifier, which eliminates the need for the global static variable to keep count of each instance of a executable module. According to another aspect of an enhanced embodiment, the signature assignment records (402) may be encrypted with a key in order to allow debugging without allowing access to the source code, and the signature records can be stored on a networked drive so that those performing debugging may have access to signatures for modules which they did not develop themselves.

According to FIG. 5, the module entry signature code segment (50) inserted at the entry point of each application program module first pushes an assigned unique module identifier value onto the stack (51). Then, it checks the current value of the instance counter for that code module type (52), and increments the counter. This is the instance count for this particular instance of the module, which is pushed onto the stack following the identifier module (53). Finally, a data value indicating that this signature triplet is an entry signature for this module instance is pushed onto the stack (54), and the normal application code is then executed.

Turning to FIG. 6, the module exit signature code segment (60) which is inserted prior to an application program module exit statement (such as a "return" or "terminate" statement) is shown. First, the module's identifier value is pushed onto the stack (61). Then, the module's stack frame is searched to find the entry signature triplet, and the instance number is retrieved from the entry triplet and the instance value is pushed onto the stack (63). Finally, an exit indicator is pushed onto the stack, completing the exit signature triplet for this module instance, followed by allowing the normal module termination code to execute.

It will be understood from the foregoing description that various modifications and changes may be made in the preferred embodiment of the present invention without departing from its true spirit, such as the use of alternate programming methodologies or languages, alternate microprocessor architectures, and software development tool sets. It is intended that this description is for purposes of illustration only and should not be construed in a limiting sense. The scope of this invention should be limited only by the language of the following claims.

What is claimed is:

1. An automated method comprising:
   inserting stack signature marking segment program instructions into one or more re-entrant programming source code modules stored in a computer-readable storage memory, the stack signature marking segment program instructions being inserted prior to compilation of the programming source code modules at each code module entry point and at each code module exit point;
   producing one or more executable programs in a computer-readable storage memory from the programming source code modules having the inserted stack signature marking segment program instructions;
   upon execution of instances of the executable programs:
      assigning unique, non-duplicated module identifier values to the instances of the code modules by the stack signature marking segment program instructions, and generating an instance count for each instantiation of executable code module in the stack signature for each object instance dynamically created during runtime of a re-entrant executable code module;
   pushing by the executed programs by a processor onto a processing stack stored in a computer-readable storage memory the module identifier values and the instance counts within stack frames allocated to each of the executable program instances.

2. The automated method as set forth in claim 1 further comprising pushing onto the stack an entry/exit indicator associated with the unique module identifier.

3. The automated method as set forth in claim 1 further comprising providing a global control which enables insertion of stack signature marking segment program instructions into all application source code modules.

4. The automated method as set forth in claim 1 further comprising providing a selective control which enables insertion of stack signature marking segment program instructions into only certain application source code modules.

5. The automated method as set forth in claim 1 further comprising encrypting at least a portion of the identifier values.

6. The automated method as set forth in claim 1 further comprising encrypting an instance number in the identifier values.

7. The automated method as set forth in claim 1 wherein pushing identifiers onto a processing stack comprises:
   generating a pseudo-random identifier for each object instance dynamically created during runtime of a re-entrant executable code module; and including the pseudo-random identifier in the identifier pushed onto the processing stack.

8. A computer program product comprising:
a computer readable storage memory suitable for storing or encoding computer programs;
first computer instructions for inserting stack signature marking segment program instructions into one or more re-entrant programming source code modules stored in a computer-readable storage memory, the stack signature marking segment program instructions being inserted prior to compilation of the programming source code modules at each code module entry point and at each code module exit point;
second computer instructions for producing one or more executable programs in a computer-readable storage memory from the programming source code modules having the inserted stack signature marking segment program instructions; and
third computer instructions for, upon execution of instances of the executable programs:
assigning unique, non-duplicated module identifier values to the instances of the code modules by the stack signature marking segment program instructions,
generating an instance count for each instantiation of executable code module in the stack signature for each object instance dynamically created during runtime of a re-entrant executable code module, and
pushing by the executed programs by a processor onto a processing stack stored in a computer-readable storage memory the module identifier values and the instance counts within stack frames allocated to each of the executable program instance;
wherein the first, second and third computer instructions are stored by the computer readable storage memory.

9. The computer readable storage memory device as set forth in claim 8 further comprising fifth program instructions for pushing onto the stack an entry/exit indicator associated with the unique module identifier, wherein the fifth computer instruction is stored by the computer readable storage memory.

10. The computer readable storage memory device as set forth in claim 8 further comprising fifth program instructions for providing a global control to enable insertion of stack signature marking segment program instructions into all application source code modules, wherein the fifth computer instruction is stored by the computer readable storage memory.

11. The computer readable storage memory device as set forth in claim 8 further comprising fifth program instructions for providing a selective control to enable insertion of stack signature marking segment program instructions into only certain application source code modules, wherein the fifth computer instruction is stored by the computer readable storage memory.

12. A system comprising:
a computer system having a processor and one or more computer readable storage memory devices;
a control portion of the computer system operable by a user to enable insertion of stack signature marking program code segments into re-entrant application program source code modules at each entry point and each exit point of the application program modules;
a code inserter portion of the computer system which, responsive to the operation of the control, searches for entry points and exits points in application program source code modules, and inserts modules stack signature marking code segments following each entry point and prior to each exit point into un-compiled source code of the application program modules;
a compiler which produces one or more executable programs from the application source code program modules having the inserted stack signature marking code segments; and
a debugger which, upon execution of the compiled executable programs including the stack signature marking code segments, assigns unique and non-duplicated module identifier values to each instance of the code modules by the signature marking code segments, generates an instance count for each instantiation of executable code module in the stack signature for each object instance dynamically created during runtime of a re-entrant executable code module, and pushes the module identifiers and instance counts onto a processing stack within stack frames allocated to the instances of the modules.

13. The system of claim 12 wherein the control comprises a global control for indicating insertion of stack signature marking code segments are to be inserted into all application program modules to be compiled.

14. The system of claim 12 wherein the control means comprises a selective control for indicating specific application program modules or groups of application program modules into which stack signature marking code segments are to be inserted.

* * * * *